United States Patent
Walia et al.

(10) Patent No.: US 10,699,070 B2
(45) Date of Patent: Jun. 30, 2020

(54) DYNAMIC RETRIEVAL AND RENDERING OF USER INTERFACE CONTENT

(71) Applicant: SAP SE, Walldorf (DE)

(72) Inventors: Sanju Walia, Rohtak (IN); Jyoti Kushwaha, New Delhi (IN); Aditya Srivastava, Ballia (IN)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 15/912,149

(22) Filed: Mar. 5, 2018

(65) Prior Publication Data

US 2019/0272315 A1 Sep. 5, 2019

(51) Int. Cl.
G06F 17/20 (2006.01)
G06F 40/183 (2020.01)
G06F 3/0482 (2013.01)
G06F 16/903 (2019.01)
G06F 40/177 (2020.01)
G06F 40/205 (2020.01)

(52) U.S. Cl.
CPC .......... *G06F 40/183* (2020.01); *G06F 3/0482* (2013.01); *G06F 16/903* (2019.01); *G06F 40/177* (2020.01); *G06F 40/205* (2020.01)

(58) Field of Classification Search
CPC .... G06F 17/247; G06F 16/903; G06F 3/0482; G06F 16/86; G06F 2201/80; G06F 2212/163
See application file for complete search history.

(56) References Cited

U.S. PATENT DOCUMENTS

| | | | |
|---|---|---|---|
| 7,062,502 B1 | 6/2006 | Kesler | |
| 7,454,695 B1* | 11/2008 | Grigoriev | G06F 17/227 |
| | | | 715/227 |
| 7,584,172 B2* | 9/2009 | Heuer | G06F 16/248 |
| 8,229,944 B2 | 7/2012 | Latzina et al. | |
| 9,104,784 B2* | 8/2015 | Nelke | G06F 16/2272 |
| 9,342,566 B2* | 5/2016 | Reddy | G06F 16/248 |
| 10,108,668 B2* | 10/2018 | Liu | G06F 16/24552 |
| 2006/0294098 A1* | 12/2006 | Thomson | G06F 16/2465 |
| 2009/0063538 A1 | 3/2009 | Chitrapura et al. | |
| 2010/0185934 A1* | 7/2010 | Fortuna | G06F 16/951 |
| | | | 715/234 |
| 2013/0132811 A1* | 5/2013 | Ludwig | G06F 17/246 |
| | | | 715/212 |
| 2013/0338453 A1* | 12/2013 | Duke | A61B 5/7282 |
| | | | 600/309 |

(Continued)

FOREIGN PATENT DOCUMENTS

CN 103593485 A 2/2014

*Primary Examiner* — Shahid K Khan
(74) *Attorney, Agent, or Firm* — Klarquist Sparkman, LLP

(57) ABSTRACT

In one general aspect, a method and system are described for generating a map data structure constructed in a tabular form. The map data structure may include a plurality of keys indicated in column headers and a plurality of lists of values indicated in rows. Each list of values may be mapped to a respective key in the plurality of key. The map data structure may be iteratively parsed for each key to generate a plurality of additional columns and additional data. The additional columns and the additional data may be rendered in an updated tabular representation as an extension of the first tabular representation in the user interface.

20 Claims, 11 Drawing Sheets

(56) References Cited

U.S. PATENT DOCUMENTS

| | | | |
|---|---|---|---|
| 2014/0046927 A1* | 2/2014 | Nelke | G06F 16/2272 707/713 |
| 2014/0172776 A1* | 6/2014 | Liu | G06F 16/24552 707/600 |
| 2014/0372482 A1* | 12/2014 | Martin | G06F 16/2465 707/776 |
| 2015/0095299 A1* | 4/2015 | Dickie | G06F 16/164 707/700 |
| 2015/0112989 A1* | 4/2015 | Marti | G06Q 10/06 707/737 |
| 2015/0261728 A1* | 9/2015 | Davis | G06F 16/93 715/234 |
| 2015/0261729 A1* | 9/2015 | Davis | G06F 16/986 715/234 |
| 2017/0046412 A1* | 2/2017 | Levy | G06F 16/23 |
| 2017/0083589 A1* | 3/2017 | Pominville | G06F 16/248 |
| 2017/0180211 A1* | 6/2017 | Johnson | H04L 67/10 |
| 2019/0095395 A1* | 3/2019 | Piecko | G06F 16/26 |
| 2019/0188282 A1* | 6/2019 | Dwyer | G06F 16/248 |

* cited by examiner

| Key 302 | Value 306 |
|---|---|
| Column header 304 | Column values 308 |

FIG. 3A

| Key1 310 | [Row1-1, Row2-1, Row3-1, ..., RowN-1] | —312 |
| Key2 314 | [Row1-2, Row2-2, Row3-2, ..., RowN-2] | —316 |
| Key3 318 | [Row1-3, Row2-3, Row 3-3, ...,RowN-3] | —320 |
| KeyN 322 | [Row1-N, Row2-N, Row3-N, ..., RowN-N] | —324 |

FIG. 3B

| Key1 326 | Key2 328 | Key3 330 | . . . . | KeyN 332 | |
|---|---|---|---|---|---|
| Row1-1 | Row1-2 | Row1-3 | . . . . | Row1-N | —334 |
| Row2-1 | Row2-2 | Row2-3 | . . . . | Row2-N | —336 |
| Row3-1 | Row3-3 | Row3-3 | . . . . | Row3-N | —338 |
| RowN-1 | RowN-2 | RowN-3 | . . . . | RowN-N | —340 |

FIG. 3C

| | 404 | 406 | 408 | 410 | 412 | 414 | 416 |
|---|---|---|---|---|---|---|---|
| | Competitor | Jan Games | Feb Games | ... | Dec Games | Lost Games | Lost To |
| | G1 | | | | | | |
| | G1 | | | | | | |
| | ... | | | | | | ... |
| | G1 | | | | | | |
| | ... | | | | | | ... |
| | G2 | | | | | | |
| | G2 | | | | | | |
| | ... | | | | | | ... |
| | G2 | | | | | | |
| | ... | | | | | | ... |
| | .... | | | | | | .... |
| | G1000 | | | | | | |

| Competitor 422 | Lost to G1 424 | Lost to G2 426 | ... 428 | Lost to Gn 430 | G1 Record 446 | G2 Record 448 |
|---|---|---|---|---|---|---|
| G1 434 | 0 436 | G2-G1 438 | ... | Gn-G1 | NULL | 9-0 |
| G2 440 | G1-G2 442 | 0 444 | ... | Gn-G2 | 0-9 | NULL |
| ... | ... | ... | ... | ... | ... | ... |
| Gn | G1-Gn | G2-Gn | ... | 0 | 0-20 | 20-0 |

FIG. 4B

| Team 456 | Win Margin 458 | Award 460 | Total Awarded 462 |
|---|---|---|---|
| Team.1 | 100 | 50 | 50 |
| Team.2 | 50 | 10 | 10 |
| Team.3 | 40 | 20 | 20 |
| Team.4 | 80 | 40 | 50 |

FIG. 4C

| Key | Value |
|---|---|
| Delta Team 1 | Delta(1-1), Delta(2-1), Delta(3-1) |
| Delta Team 2 | Delta(1-2), Delta(2-2), Delta(3-2) |
| Delta Team 3 | Delta(1-3), Delta(2-3), Delta(3-3) |

| Key | Value |
|---|---|
| Delta Team 1 | 0, -50, -60 |
| Delta Team 2 | 50, 0, -10 |
| Delta Team 3 | 60, 10, 0 |

| Key | Value |
|---|---|
| Teams | Team1, Team2, Team3 |
| Total awards | 100, 50, 40 |
| Delta Team 1 | 0, -50, -60 |
| Delta Team 2 | 50, 0, -10 |
| Delta Team 3 | 60, 10, 0 |

| Teams | 476<br>Total Wins | 478<br>Team.1 (delta Total) | 480<br>Team.2 (delta Total)<br>Team 1 - Team 2 = 50 | 482<br>Team.3 (delta Total)<br>Team 1 - Team 3 = 60 | ... |
|---|---|---|---|---|---|
| Team.1 | 100 | 0 | 0 | 10 | |
| Team.2 | 50 | -50 | 0 | 0 | |
| Team.3 | 40 | -60 | -10 | 0 | |
| ... | | | | | |

FIG. 4G

| | | P_CODE | P_STATUS | P_ESTIMATEDVALUE | P_XXXX | P_xxxxxxxxxxx | P_xxxxxxxxxxxx | P_xxxxxxxxxxxxx | P_XXXX | P_XXXX |
|---|---|---|---|---|---|---|---|---|---|---|
| | | | |Sort..|Filter | | | | | | |
| 1 | | 00000001 | Opp52 | 400000 | 01-JUN-17 09.21.00.0000 PM | PSS | MS18 | CN1 | (null) | J12 |
| 2 | | 00000002 | Opp57 | 500000 | 01-JUN-17 12.00.00.0000 AM | Sold | MS14 | CN1 | (null) | J13 |
| 3 | | 00000003 | Opp57 | 250000 | 01-JUN-17 12.00.00.0000 AM | Sold | MS13 | CN2 | (null) | J12 |
| 4 | | 00000004 | Opp55 | 100000 | 01-JUN-17 12.00.00.0000 AM | Opp54-Opp55.. | MS12 | CN1 | CN2 | (null) |
| 5 | | 00000005 | Opp55 | 250000 | 01-JUN-17 12.00.00.0000 AM | Opp54-Opp55.. | MS8 | CN2 | CN6 | J13 |
| 6 | | 00000006 | Opp55 | 500000 | 01-JUN-17 12.00.00.0000 AM | Opp54-Opp55.. | MS11 | CN1 | CN6 | (null) |
| 7 | | 00000007 | Opp57 | 250000 | 01-JUN-17 12.00.00.0000 AM | Sold | MS10 | CN6 | (null) | J13 |
| 8 | | 00000008 | Opp53 | 2500000 | 01-JUN-17 12.00.00.0000 AM | PSJ | MS5 | CN1 | (null) | J12 |
| 9 | | 00000009 | Opp54 | 250000 | 01-JUN-17 12.00.00.0000 AM | Prospect | MS14 | CN2 | (null) | J11 |
| 10 | | 00000010 | Opp51 | 50000 | 01-JUN-17 12.00.00.0000 AM | PSS | MS17 | CN1 | (null) | J11 |

| COMPETITOR NAME | TOTAL SALES | SALES% | BIDS WON | BIDS WON% | DAION WON | OTHER | NO BID |
|---|---|---|---|---|---|---|---|
| HITACHIE | 1100000 | 68.75 | 500000 | 45.45 | 100000 | 500000 | 0 |
| DAIKIN | 500000 | 31.25 | 250000 | 50.00 | 0 | 250000 | 0 |
| TOTAL | 1600000 | | | | | | |

FIG. 5B

| COMPETITOR NAME | TOTAL SALES | SALES% | BIDS WON | BIDS WON% | DAIKON WON | AAON WON | OTHER | NO BID |
|---|---|---|---|---|---|---|---|---|
| HITACHI | 1100000 | 59.45 | 500000 | 45.45 | 100000 | 500000 | 0 | 0 |
| DAIKON | 500000 | 27.02 | 250000 | 50.00 | 0 | 250000 | 0 | 0 |
| AAON | 250000 | 13.51 | 250000 | 100.00 | 0 | 0 | 0 | 0 |
| TOTAL | 1850000 | | | | | | | |

FIG. 5C

| Key 528 | Value 532 |
|---|---|
| Competitor | Hitachi, Daikin, Total |
| Total Sales | 1100000, 500000, 1600000 |
| Sales% | 68.75, 31.25 |
| Bids Won | 500000, 250000 |
| Bids Won % | 45.45, 50.00 |
| Delta Daikin Won 530 | 100000, 0 |
| Other | 500000, 250000 |
| No Bid | 0, 0 |

| Key 536 | Value 542 |
|---|---|
| Competitor | Hitachi, Daikin, Aaon, Total |
| Total Sales | 1100000, 500000, 250000, 1600000 |
| Sales% | 59.45, 27.02, 13.51 |
| Bids Won | 500000, 250000, 250000 |
| Bids Won % | 45.45, 50.00, 100.00 |
| Delta Daikin Won 538 | 100000, 0, 0 |
| Delta Aaon Won 540 | 500000, 250000, 0 |
| Other | 0, 0, 0 |
| No Bid | 0, 0, 0 |

DYNAMIC RETRIEVAL AND RENDERING OF USER INTERFACE CONTENT

TECHNICAL FIELD

The description, in particular, relates to systems and techniques for rendering data in user interfaces.

BACKGROUND

Conventional computer systems are capable of capturing and storing large amounts of data in a columnar database management system (DBMS). A columnar DBMS stores data tables organized by column rather than by row. By storing data in columns rather than rows, the database can precisely access the data without excessive scanning and discarding of unwanted data in rows.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described that includes retrieving content from at least one database. The content may include a plurality of data columns stored in the at least one database. The method may include rendering a first tabular representation of the retrieved content in a user interface and responsive to receiving, in the user interface, a data selection command selecting a portion of the content in the first tabular representation, generating a plurality of keys corresponding to each element selected in the portion, generating, for each of the plurality of keys, a query to retrieve a plurality of values corresponding to each respective key, and receiving, for each query corresponding to each key, a list of values pertaining to the respective key responsive to the respective query. The method may further include generating a map data structure constructed in a tabular form and having the plurality of keys indicated in column headers and each list of values indicated in rows. Each list of values may be mapped to a respective key in the plurality of keys. The method may further include iteratively parsing the map data structure for each key to generate a plurality of additional columns and additional data and rendering the additional columns and the additional data in an updated tabular representation as an extension of the first tabular representation in the user interface. Other embodiments of this aspect include corresponding computer systems, apparatus, and computer programs recorded on one or more computer storage devices, each configured to perform the actions of the methods.

Implementations may include one or more of the following features. In some implementations, the content further includes formatting information associated with the at least one database and the first tabular representation is formatted according to a format defined in the at least one database. In some implementations, the additional columns and the additional data are retrieved from the database and formatted according to the map data structure.

In some implementations, the selected portion of the content includes a plurality of elements representing two or more rows and two or more columns of the content. In some implementations, the updated tabular representation includes a variable number of columns based on a number of elements selected in the portion. In some implementations, responsive to receiving an additional data selection command in the user interface, the additional data selection command selecting a second portion in the updated tabular representation, the method includes generating a second set of keys corresponding to each element selected in the second portion. In some implementations, the method may include generating, for each of the second set of keys, a query to retrieve a plurality of values corresponding to each respective key in the second set of keys. In some implementations, the method may include receiving, for each query corresponding to each key in the second set of keys, a list of values pertaining to the respective key in the second set of keys and responsive to the respective query corresponding to each of the second set of keys. In some implementations, the method may include generating a second map data structure constructed in tabular form and having the second set of keys indicated in column headers and each list of values, pertaining to the respective key in the second set of keys, indicated in rows, each list of values being mapped to a respective key in the second set of keys.

In some implementations, the method may further include iteratively parsing the second map data structure for each key in the second set of keys to generate and render, in the user interface, a third tabular representation. In some implementations, the third tabular representation is rendered as an extension of the first tabular representation and the updated tabular representation, where the first tabular representation, the updated tabular representation, and the third tabular representation are rendered adjacent to one another in a combined table in the user interface. In some implementations, the additional columns and the additional data are retrieved using the map data structure, but are not indicated as columnar data retrievable from the at least one database using a format defined in the at least one database. Implementations of the described techniques may include hardware, a method or process, or computer software on a computer-accessible medium. Other embodiments of the above aspects include corresponding computer systems, apparatus, and computer programs recorded on one or more computer storage devices, each configured to perform the actions of the methods.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

FIGS. 3A-3C are example screenshots depicting an example of generating key value pairs, in accordance with the principles of the present disclosure.

FIGS. 4A-4G are example screenshots depicting another example of generating user interface content, in accordance with the principles of the present disclosure.

FIGS. 5A-5E are example screenshots depicting another example of generating user interface content, in accordance with the principles of the present disclosure.

Like reference symbols in the various drawings indicate like elements.

DETAILED DESCRIPTION

Figure 1:
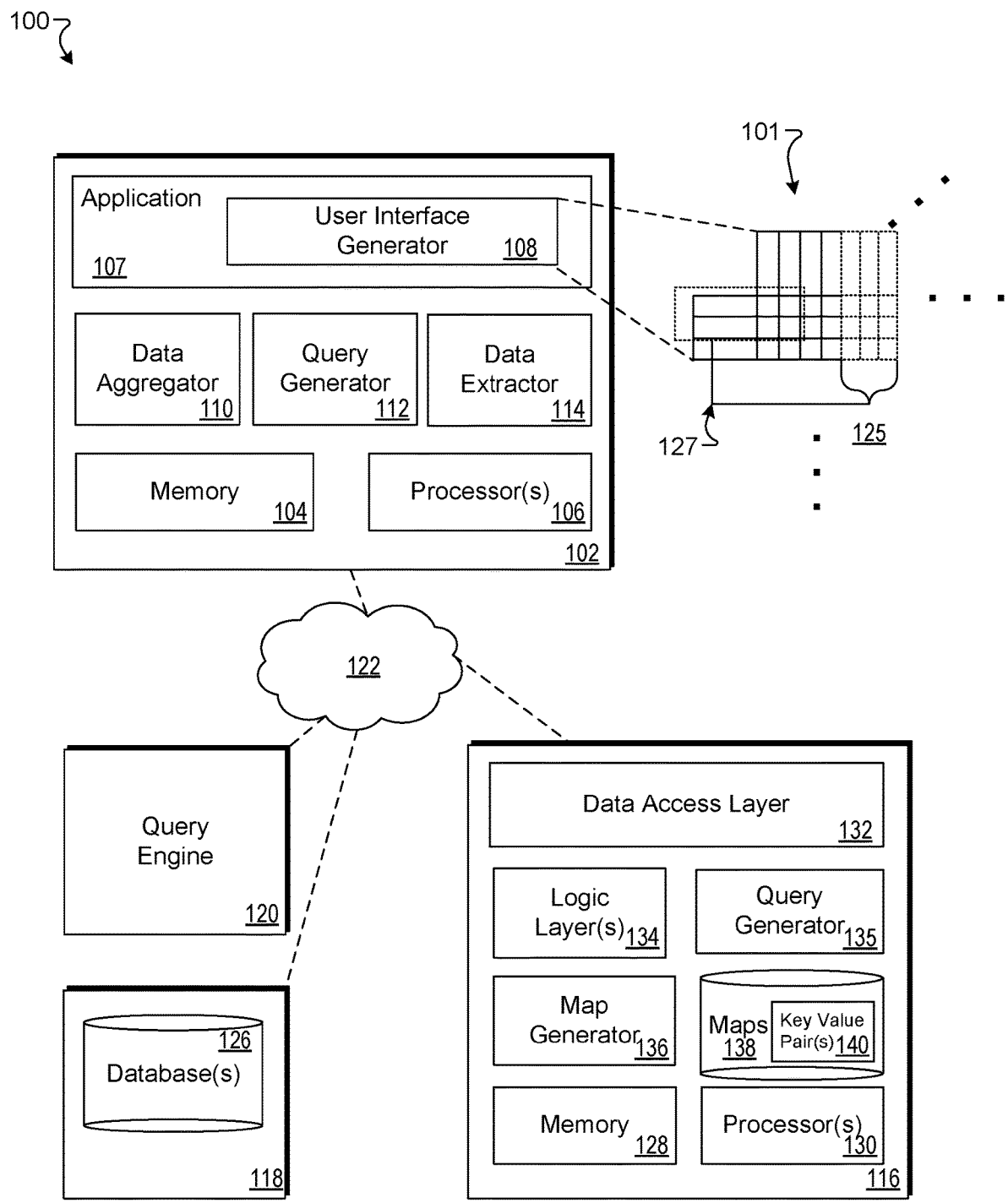
FIG. 1 is a block diagram representing an example system for dynamically rendering of user interface content in accordance with the principles of the present disclosure.

Systems and techniques are provided for generating data structures that may dynamically retrieve data from database tables of one or more databases. The systems and methods described herein may enable a user to select upon electronically displayed data content to automatically trigger generation and display of additional data using the data structures. For example, a user may select upon a number of data elements in a table presented with a number of rows and columns. The systems and methods described herein can use the selected data content to generate a data structure configured to retrieve the additional data. The additional data may be used to generate additional columns (or aspects) of data not detailed as columned data in the source database(s), for example. This can provide an advantage of enabling the user to be presented various combinations of data that are not available when querying the databases with standard indexed queries.

The systems and methods described herein can enable presentation of user-determined columnar data. For example, a user may select upon particular data within any number of row and/or columns of interest in a table of data displayed as a report in a user interface. The particular data can be used to generate new aspects of data to add to the report, for example, to aid the user in understanding aspects of data that may otherwise be difficult to discern, such as correlated data values generated by correlating particular columns and rows of data, even when a quantity of data stored within the source databases is very large and not organized to provide such aspects when receiving queries generated using standard query techniques. Moreover, as described below, the systems and methods may provide an updated graphical representation (e.g., UI table(s)) in a dynamic, adjustable, and interactive manner, so that the user is provided with an ability to obtain desired results from data analyses, even for different arrangements and calculations based on the source databases. Such graphical representations may be provided by a user interface generator without requiring advanced technical knowledge on the part of the user.

In some implementations, the databases described herein are fixed column databases. Fixed column databases may include any number of database tables with columns and rows of data defined by a columnar database structure (e.g., a column-oriented database structure). A column-oriented fixed column database serializes (e.g., combines in a delimited or additive fashion) all of the values of each individual column together. For example, a first column of data may be serialized in one structure, a second column of data may be serialized in another structure, and a third column of data may be serialized in yet another structure, and so on. Because the data is organized and defined by columns rather than rows, queries can be generated to target the columns in the database to precisely access data without excessive scanning and discarding of unwanted data in the rows of the database.

If a user (or computing system) wishes to view a combination of data that is not defined by any of the columns in a particular database, the user may be unable to retrieve such data using standard query-database techniques. That is, the columns may represent an indexed view of the data in which to base queries upon. Such an indexed view cannot be used if the user does not specifically indicate a column header (e.g., dimension and/or description of data in the column) in the query. The systems and techniques described herein mitigate such a problem by providing a new data structure and technique to dynamically retrieve data from database tables of a fixed column database. More particularly, data may be retrieved using such data structures to dynamically retrieve data from the database without requiring the retrieved data or query to be organized according to the defined DBMS.

The techniques described herein may be used to mitigate effects that limit how data can be retrieved from a fixed column database. For example, new data structures are presented that enables data retrieval without abiding by the parameters of the indexed and or storage rules associated with a particular database. Thus, data can be accessed, retrieved, and rendered for display from any number of databases organized according to differing data structures. One example data structure may include a map data structure that can organized user-selected data to retrieve additional columns of data for display according to the map data structure and alongside existing displayed data. That is, the data structures described herein can be used to display, in a user interface, columns of data from a database alongside additional columns of data generated using data selected from the user interface. The generated additional columns may appear in the user interface as if the data in the additional columns were associated with columns stored in the database. In general, the map data structure provides a mechanism to describe the user-selected data such that a query can be generated to retrieve and display specific content from the database without having to query the database according to the database-defined organizational structure.

FIG. 1 is a block diagram representing an example system 100 for dynamically rendering of user interface content in accordance with the principles of the present disclosure. The system 100 typically provides an ability to utilize databases 126 (e.g., source datasets, measures, dimensions, etc.) to visualize (e.g., generate for display) and/or analyze a targeted number of specific dimensions and measures from large multi-dimensional datasets based upon extracting data pertaining to a user selection corresponding to a UI table (e.g., rows and columns) depicted in a user interface, as shown by example UI table 101. In some implementations, the system 100 may generate user interfaces that include at least a shell container, executing in a web browser. The shell container may provide or have access to a plurality of services for configuring a plurality of user interface content (e.g., UI tables, graphics, controls, etc.). The application may include or be provided in an application container, executing in the web browser with access to any number of programmed processors.

The system 100 includes a computing device 102 having at least one memory 104 and at least one processor 106, each capable of executing and/or storing software and/or firmware pertaining to application 107, user interface generator 108, data aggregator 110, query generator 112, and/or data extractor 114. The computing device 102 may communicate with one or more other computing devices, e.g., computing device 116, device 118, query engine 120, etc. over a network 122. The computing devices 102, 116, 118, and query engine 120 may be implemented as any number of servers, desktop computers, laptop computers, mobile devices such as a tablet device or mobile phone device, as well as other types of computing devices.

Although a single computing device 102 is illustrated, the computing device 102 may be representative of multiple computing devices in communication with one another, such as multiple clients or servers in communication with one another being utilized to perform its various functions over a network or any number of networks. Similarly, although a single computing device 116 is illustrated, the computing device 116 may be representative of multiple computing devices in communication with one another, such as multiple clients or servers in communication with one another being utilized to perform its various functions over a network or any number of networks.

The computing device 102 may be communicably coupled to computing device 116, query engine 120, and computing device 118 via wireless, wired, or other networked connection. In some implementations, the computing device 102 is a server device while computing device 116 is a client device. In some implementations, the computing device 102 is a client device while computing device 116 is a server device.

In general, the computing device 102 may provide user interfaces depicting data received via network 122 from computing device 116, computing device 118, and/or query engine 120. Other computing devices are possible and may be operable with devices depicted in FIG. 1.

In the example of FIG. 1, the user interface generator 108 is configured to provide at least one graphical representation (e.g., UI table 101) on a display device via application 107, in order to facilitate an illustration, interpretation, and use of data retrieved from database 126 in device 118. Here, the UI table 101 represents a table that may be displayed and expanded (125) in any direction, as illustrated by the number of ellipses shown in FIG. 1. In some implementations, the application 107 includes a GridView interactor used for displaying and editing data in a tabular data grid. The GridView may display each data object in a separate row and each object field in a separate column. In general, all rows in the grid have the same columns structure, and thus contain the same controls.

Database 126 may represent any number of fixed column databases that include database tables with columns and rows of data defined by a columnar database structure (e.g., a column-oriented database structure). To expand a particular UI table, the system 100 may receive a selection 127 indicated by a user viewing the UI table. The content within the selection 127, for example, may be used to generate a data structure (e.g., a map data structure) to describe the selection 127. The map data structure may be used to obtain targeted information from a database. The targeted information may be generated in additional columns 125 for display according to the defined map data structure, rather than according to the database defined structure.

As described in detail below, a user of the computing device 102 may be provided with an ability to use data that is displayed in application 107 to automatically generate a resultant graphical representation that includes additional columns (or aspects) of data not detailed as columned data in the database 126, for example. This can provide an advantage of enabling the user to understand aspects of data that may otherwise be difficult to discern, such as correlated data values generated by correlating particular columns and rows of data, even when a quantity of data stored within the database 126 is very large and not organized to provide such aspects when receiving queries generated using standard query techniques. Moreover, as also described below, the system 100 provides an updated graphical representation (e.g., UI table(s) 101) in a dynamic, adjustable, interactive manner, so that the user is provided with an ability to obtain desired results from data analyses, even for different types and values of the database 126. Such graphical representations may be provided by the application 107 via the user interface generator 108 without requiring advanced technical knowledge on the part of the user.

In some implementations, the techniques described herein may include receiving a user selection of data being presented in a UI table 101, for example, (or other data arrangement) presented in a user interface, determining a size for a new UI table, generating a data structure using the selection, generating a query using the data structure, and retrieving the desired combination of data in order to generate additional columns of data for the table being presented and selected upon in the user interface. Because the user selects content from the UI table 101, a data structure size can be generated on the fly without prior knowledge of the data itself. Thus, any resulting UI table update need not take into account a maximum display limit (or area) for depicting updated content. The system 100 can utilize the number of selected items to properly limit the table display because a maximum number of entries will be generated based upon the selection.

Referring again to FIG. 1, the computing device 102 may include the application 107. In general, the application 107 may be a report generation application, a productivity application, a web application, a website, or other application capable of depicting graphical content. The application 107 may utilize the data aggregator 110 to group particular data for use in querying for data from one or more databases. Use of the data aggregator 110 can decrease bandwidth usage of the application 107 displaying the user interfaces, for example. The data aggregator 110 may generate lists of data to represent key-value pairs described herein.

The query generator 112 is configured to generate a query for each key generated in a map 138, for example. The query may retrieve data from a database 126 (e.g., source datasets) using data extractor 114 and data aggregator 110 to generate a list of rows for each key. In some implementations, the query generator 135 on the server device 116 may perform one or more additional queries to retrieve particular data associated with the key in the map 138. In some implementations, the query generator 112 (or query generator 135) may generate structured query language (SQL) queries that may be executed to match particular keys with data and/or metadata in the databases 126 or associated with a particular structure of the databases 126 or the structure of the maps 138. When a match is found, the query may return information to identify a matched portion of the databases and/or structures. For example, the returned information may include an identifier for a space where the database data structure is located, an identifier for the database data structure, an identifier in one or more maps, an identifier for the matched column name, and/or a unique identifier for the matched column. The search term and the returned information may be added to a map data structure of key-value pairs that may be used to determine a search set of database data structures.

The computing device 116 may include at least one memory 128 and at least one processor 130, each capable of executing and/or storing software and/or firmware pertaining to a data access layer 132, logic layers 134, query generator 135, and map generator 136 storing maps 138. Similarly, query engine 120 and computing device 118 may also include any number of processors or memory structures.

The data access layer 132 (DAL) includes computer programs and algorithms that may provide access to data stored in any number of databases accessible using the logic layer 134. The logic layer 134 may include class information for retrieving particular data from the number of databases. In some implementations, the logic layer 134 may implement particular functionality for one or more applications 107 that may be provided to users.

The map generator 136 is configured to generate maps having key-value pairs. The maps may be used as the data construct in which to retrieve particular information from the database 126, for example. The map generator 136 may generate maps 138 upon receiving a user selection of data within a graphical structure. The graphical structure may be a table, a graph, a list, or other representation of selectable data retrieved from a database. Each map 138 includes one or more key-value pairs 140. Each key generated in the map 138 corresponds to the user selections, hence a key represents a column of a resultant table (R) generated from the selected data. Each value generated in the map 138 and that is associated with a particular key includes a list of entries (List<entries>), so the list holds all the row values for a column. Based on the user selection, the device 116 may create keys for a map (M) 138. For example, if the user selected four data items, the device 116 may generate four keys in a map. Thus, the system 100 may not be required to anticipate data structure size up to a maximum limit As used herein, a column may be considered to include a measure (e.g., measure data) if the column contains data that is numerical data being analyzed and/or utilized in a particular data structure. As used herein, a column may be considered to include a dimension if the column contains data that is descriptive or otherwise provides contextual information for particular measure data. In the examples described throughout this disclosure, several columns of dimensional data are provided with various column names that provide a description of such dimensional data.

Figure 2:
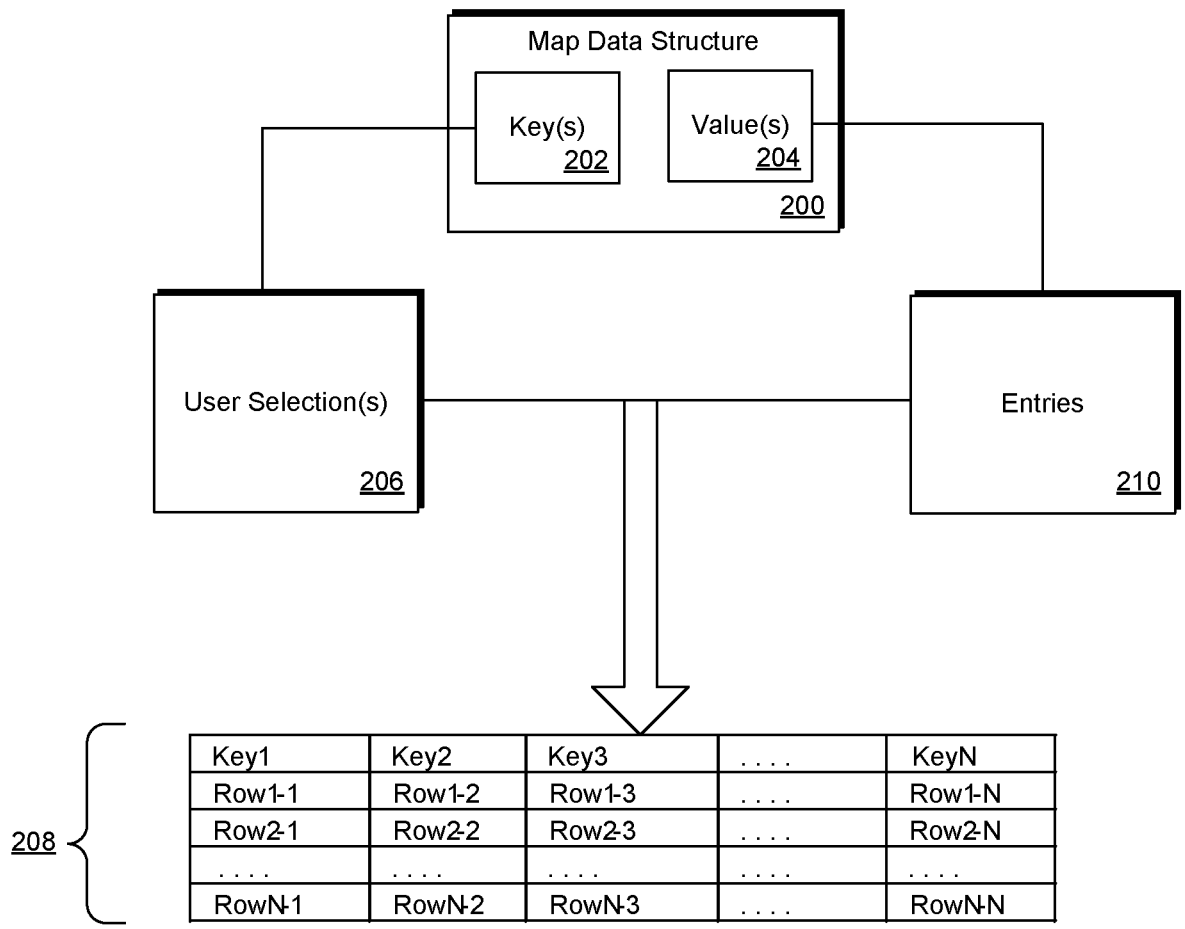
FIG. 2 is an example process used to generate data having a map data structure, in accordance with the principles of the present disclosure.

FIG. 2 is an example process used to generate data having a map data structure 200, in accordance with the principles of the present disclosure. The map data structure 200 may be used to query a data. The map data structure 200 includes one or more keys 202 and one or more values 204. As used herein, a map 138 may include data to be stored as a map data structure (M) 200. Each map 138 having a map data structure 200 includes one or more key-value pairs. In some implementations, such a structure (M) may be represented as several key-value pairs (e.g., <key, value>) that can be generated to query databases 126 (e.g., source datasets).

In general, a key may correspond to a column of data. A value may correspond to one or more values in the columns. In general, each key 202 corresponds to a content item in which the user selects upon, indicated here as user selections 206. For example, if the user selects four rows in a UI table, four keys may be generated to represent four new columns of data in an updated UI table. That is, each key may represent a column of a resultant (e.g., updated) table 208. The value associated with each key is a list of entries 210. A list (e.g., (List<entries>)) may hold all row values for a particular column, as shown in table 208.

In some implementations, a map data structure may contain key-value pairs in which the value is used as a list of data/objects. By contrast, a traditional data map structure may contain key-value pairs with a value as a singular data/object, rather than as a list of data/objects. In some implementations, the map data structure may include, for example, dynamic data (e.g., based on user selection) as well as static data. The static data may refer to data that does not change with user selections. In addition, static data may help a user to interpret information shown in an updated UI table.

FIGS. 3A-3C are example screenshots depicting an example of generating key-value pairs, in accordance with the principles of the present disclosure. To begin generation of such key-value pairs, a user may be viewing a UI table and may wish to view additional information related to a portion of the data in the UI table. The user may select one or more portions of data in the UI table. In some implementations, selecting portions of the data may include a user interacting with a provided UI form, for example, in which the user can make multiple selections. For example, a list of teams/competitors may be provided in a UI. A user may select portions of the UI to trigger generation of a map data structure for obtaining additional and/or related data.

FIG. 3A is an example representation of a map showing a key-value pair. As shown in FIG. 3A, a selection upon a data cell, for example, may generate a key 302 representing a column header 304 corresponding to the selected data cell and may generate a value 306 representing any number of values 308 in additional rows of the UI table. As used herein, selecting a portion of data in the UI table may represent selecting a data cell, a table item, table content, a row, a column, several rows and/or several columns, etc.

FIG. 3B is an example representation of a map that the system 100 may generate once a user has performed a selection of data. For example, for each portion of data selected from a UI table (e.g., table item, cell, table content, etc.), a key-value pair may be generated. For example, FIG. 3B shows that a user selected a first portion and a second portion of the UI table. In response, the system 100 generated a first key 310 corresponding to the column header of the first portion and values (e.g., items) in rows 312 for the first key 310. Similarly, the system 100 generated a second key 314 corresponding to the column header of the second portion as well as values 316 for the second key 314. The system 100 may continue to generate key-value pairs up to N number of selected portions, as indicated by key 318 and values 320 (generated from selection of a third portion of the UI table) and key 322 and values 324 (generated from selection of an Nth portion of the UI table). Each of the listed items in row 312 correspond to all row values for a particular column that may be generated for display in an updated UI table using data retrieved with the key-value pair.

FIG. 3C depicts an example of tables that may be added to an existing UI table in response to receiving a user selection of at least three portions of the existing UI. For example, FIG. 3C shows an updated UI table rendered from the map depicted in FIG. 3B. In general, the selections may be used to generate key-value pairs, as shown in FIG. 3B. The keys within the key-value pairs may be used to generate query using query engine 120 to obtain additional data from database 126, for example. By way of example, system 100 can use query generator 135 (or alternatively query generator 112 on the client side) to query, for each key (keys shown in columns 326, 328, 330, 332, etc.), particular data from the database on device 118 utilizing aggregate functions (e.g., using data aggregator 110) or other data functions to prepare a list of row values (e.g., values 334, 336, 338, and 340) for each key column. The information for each row may be obtained from a database query using the map data structure. No other data is fetched from the database because the request indicated by the key-value pairs is specific. Thus, processor and memory usage is inexpensive and less consumptive than other database queries using traditional querying techniques.

Upon receiving data responsive to the query, the data extractor 114 may use each list of column values to map keys in the map data structure 200. For example, the data extractor 114 can iterate over the map data structure 200 for each key to render content (retrieved from the database) according to the corresponding list (i.e., based upon the map data structure 200).

In the event that the user selected ten portions a particular UI table instead of three, as in the example of FIG. 2, then the system 100 may generate ten keys and the corresponding values. The ten keys may be added into a map data structure 200, for example. The UI table may be sized to fit ten additional columns instead of three upon retrieving the additional information from the database.

In operation, the system 100 may iterate over the map shown in FIG. 3B. For each key, the system 100 may render a column header of the resultant table. For example, column 326 (Key1), column 328 (Key2), column 330 (Key3) to column 332 (Key) can be generated. In addition, for each key, the system 100 may iterate over the corresponding value list pertaining to a respective key. For example, the system 100 may render row values for each single column of the resultant table. In particular, example column 332 may be generated for KeyN. The example column 332 may include a first value 334 in a first row (e.g., value "Row1-N"), a second value 336 in a second row (e.g., value "Row2-N"), a third value 338 in a third row (e.g., value "Row3-N") up to and including an Nth row 340, as shown in FIG. 3C. Additional columns may be generated in a similar fashion.

FIGS. 4A-4G are example screenshots depicting an example of generating user interface content, in accordance with the principles of the present disclosure. FIG. 4A represents a subset 402 of a database, such as database 126. The database 126 and/or dataset 402 may represent any number of fixed column databases that include database tables with columns and rows of data defined by a columnar database structure (e.g., a column-oriented database structure). In some implementations, database 126 may be SAP HANA® database that supports storing data in column-wise (column tables) and that is optimized for column based read operations.

As shown, example dataset 402 includes competitor column 404, a January games column 406, a February games column 408, other monthly columns 410, a December games column 412, a Lost games column 414, and a Lost to column 416. Each column 404-416 includes information available for a set of teams that played competitive sports games. Such information can be queried, retrieved and displayed as shown in the columns in FIG. 4A.

In operation, the system 100 may generate columns of information that is not stored or retrieved based on column headings in the database associated with database subset (e.g., dataset 402). For example, typical data retrieval from example dataset 402 may require a user to query for data using one of the column headers 402-416 as a query part. The system 100 can query data using a different structure (e.g., a map data structure) that queries and retrieves data within a database in order to dynamically construct columns of data for display, rather than retrieving whole or partial columns of data for display.

As shown in FIG. 4B, a user interface (UI) table 420 is depicted. Table 420 includes a competitor column 422, a Lost to G1 column 424, Lost to G2 column 426, and a column 428 representing several additional Lost to columns, and a Lost to Gn column 430, representing n number of competitors. In this example, a user may have polled dataset 402 to request the data stored in the Lost to column 416. If table 420 were to be completed as polled from the dataset 402, the table would be very large and unruly to display in a UI interface without being illegible or cut off a screen.

To avoid such a display problem, the system 100 can utilize input from a user to generate a database query that extracts specific data that the user wishes to view, without having to capture all data pertaining to a particular column header. In short, the system 100 may enable data retrieval of any number of rows and columns from a database/dataset based on a user selection of data in a UI table (e.g., UI table 420) already depicted to the user. For example, a user may be viewing a UI table 420 indicating rows of sports teams and columns of games played. Each game played may indicate a score in a row that pertains to each specific team. If the user also wishes to see additional columns of data representing a metric that is unavailable in the current form of the UI table, the user may select upon particular data in the UI table to trigger retrieval and generation in the table of the additional data. For example, if the user wishes to view the score/record in each game played between two teams, for example, the UI table 420 is not structured to provide such data. Accordingly, the user may select upon particular competitors/teams to be provided display of the scores. The system 100 may present such data using the systems and techniques described herein because the database table 402 that includes the data may not be organized to present such columns of data. That is, the systems and techniques described herein may have to calculate and/or infer which team lost and which team won based on the scores available in the database. In some implementations, the wins and losses are stored in tables of the database, but are not accessible to be displayed.

As shown in FIG. 4B, the user may have selected (432) teams G1 and G2 in competitor column 422, and losses columns 424 and 426. In operation, the system 100 dynamically generates additional columns of data that can present visual aspects of additional data (e.g., the scores) that are not otherwise available in the stored data. That is, the systems and techniques described herein can assemble visual aspects and user interfaces representing data without querying the database according to the definition and rules associated with querying each particular database.

Since the table may expand in both rows and columns based on any selection, opting for a table/data structure with a fixed number of columns to hold the data may cause expensive memory read time to retrieve all columns of data of selected "competitor 422," for example instead of a column of data that the user is actually interested in viewing. In addition, as columns are not known until runtime, an anticipated data structure size would be large causing excessive time and memory resource consumption to accommodate maximum possible columns. Moreover, if additional operations (e.g. obtaining differences between team wins/loses) may have to be performed over an entire dataset to retrieve the proper information using traditional query techniques. Alternatively, filtering of the data may have to occur before appropriate sized data can be retrieved. Both options incur uncurbed memory consumption to complete.

The system 100 may use map data structures that enable dynamically fetching/retrieving selected columns from a database that does not incur excessive memory consumption because the map data structure adjusts a size of queried data because key-value pairs are limited to fetching data pertaining to the keys. The keys are limited because the system 100 generates keys from user-selected values. The map data structure enables query and retrieval of defined column data based on user-selected filtering of the data using the keys generated from the user selection. Any additional operation on the data can be performed at the database level.

As shown in FIG. 4B, the user may have selected (432) teams G1 and G2 in competitor column 422, and losses columns 424 and 426. In operation, the system 100 receives a data selection command in the user interface (e.g., selection upon area 432). The selection 432 indicates a selected portion of content in the UI table 420. The map generator 136 may use the selection 432 to generate a number of key-value pairs 140. The keys may correspond to each element selected in the selection 432. In this example, the keys may correspond to elements 434, 436, 438, 440, 442, and 444. Next, the query generator 135 may generate, for each of the keys, a query to retrieve a plurality of values corresponding to each respective key. For each query, a list of values may be received that pertain to a respective key and that is responsive to the query. A map data structure may be generated from the keys and the values in order to properly display the new information in the tabular form of the UI table 420. For example, the map generator 136 may complete one or more maps in a tabular data structure (e.g., tabular form) with the keys indicated in column headers and each list of values indicated in rows. Each list of values may be mapped to a respective key in the number of keys. The logic layer 134 may iteratively parse the map data structure for each key to generate a plurality of additional columns and additional data. The application 107 may be provided such data and the data access layer 132 may trigger rendering in the application 107 of the additional columns and the additional data, as shown by columns 446 and 448. The new UI table depicts columns 446 and 448 in an updated tabular representation 452 as an extension of the first tabular representation 450 in the user interface.

FIG. 4C illustrates another example of assembling data in which a number of columns in a UI table 454 is not known until a user indicates a selection. Here, the UI table 454 depicts a team column 456, a win margin column 458, an award column 460, and a total awarded column 462. Each column 456-462 may be represented as a column in a database (e.g., database 126).

A user may be reviewing UI table 454 in a user interface and may wish to review a comparison amongst selected teams and their wins. This may result in a user selecting (464) upon multiple rows and columns to be provided additional related data. In this example, a user may make a selection 464 on content, as shown in FIG. 4C. The selection may correspond to selection of Team.1, Team.2, and Team.3 to generate a corresponding "Total Awarded" column 458. The system 100 can take such a selection 464 and generate a map data structure for the three selected teams. The map data structure may include a list of the three teams under a column heading of Key, listed as Delta Team.1, Delta Team.2, and Delta Team.3. For each key, the system 100 can retrieve a value list by generating queries to the database. In this example, "Total Awarded" was selected and the delta of the total awards among teams may be queried and filled in to the value list 468, as shown in FIG. 4D. An example resulting table 470 after retrieving such data is shown in FIG. 4E. In this example, since two static columns (456 & 462) are to be shown also for a user's ease of use, the content may be added to the map data structure resulting in table 472, as shown in FIG. 4F. FIG. 4G illustrates the additional data in a table 474 based on the selection 464. Namely, the user selected Team.1, Team.2, and Team.3 to view additional winning data about the three teams. The UI table 474 includes additional columns which are not existent in the table 454 or in the database table of team wins and losses. The new columns as well as any corresponding values are created on the fly based on the user selection using the map data structures described herein. In this example, a user is provided with new columns of data including total wins 476, Team.1 total delta 478, Team.2 total delta 480, and Team.3 total delta 482.

FIGS. 5A-5E are example screenshots depicting another example of generating user interface content, in accordance with the principles of the present disclosure. FIG. 5A depicts an example column-oriented database 502 having a number of columns 504 that may be queried to retrieve data from the database 502. The information in database 502 may include sales data for a number of competitors. In this example, there are ten competitors.

FIGS. 5B and 5C display a sample application in which a user has selected two competitors (in FIG. 5B) and three competitors (e.g., in FIG. 5C). FIG. 5B depicts a UI table 506 that a user may be viewing in application 107, for example. The user may perform selections on content within the application to trigger dynamic generation of new content, as shown by column 508. In FIG. 5B, when two competitors are selected, then the resultant UI table is updated and new content 508 is appended to the UI table. FIG. 5C depicts a UI table 520 that a user may be viewing in application 107, for example. The user may select upon portions of rows to trigger dynamic generation of new content, as shown by column 524. When three competitors are selected, then the resultant UI table includes additional information, as shown in column 524. Selections 510 (FIG. 5B) and selection 522 (FIG. 5C) indicate how a table may grow when two or three competitors are selected, respectively, from a list displayed to a user in a form.

FIG. 5D illustrates a map data structure generated upon receiving a selection in FIG. 5B. That is, when the user selected competitors Hitachi and Daikin, shown by selection 510, the system 100 generated a map data structure 526. In this example, a number of keys 528 are created from the selection 510. In particular, the system 100 generates keys for competitor, total sales, sales percentage, bids won, bids won percentage, Delta Daikin Won 530, other, and no bid. The key 530 is dynamically generated data. Corresponding values 532 are generated for each of the keys 528.

FIG. 5E illustrates a map data structure generated upon receiving a selection in FIG. 5C. That is, when the user selected competitors Hitachi, Daikin, and Aaon, shown by selection 520, the system 100 generated a map data structure 534. In this example, a number of keys 536 are created from the selection 520. In particular, the system 100 generates keys for competitor, total sales, sales percentage, bids won, bids won percentage, Delta Daikin Won 538, Delta Aaon Won 540, other, and no bid. The keys 538 and 540 are dynamically generated data. Corresponding values 542 are generated for each of the keys 536.

Figure 6:
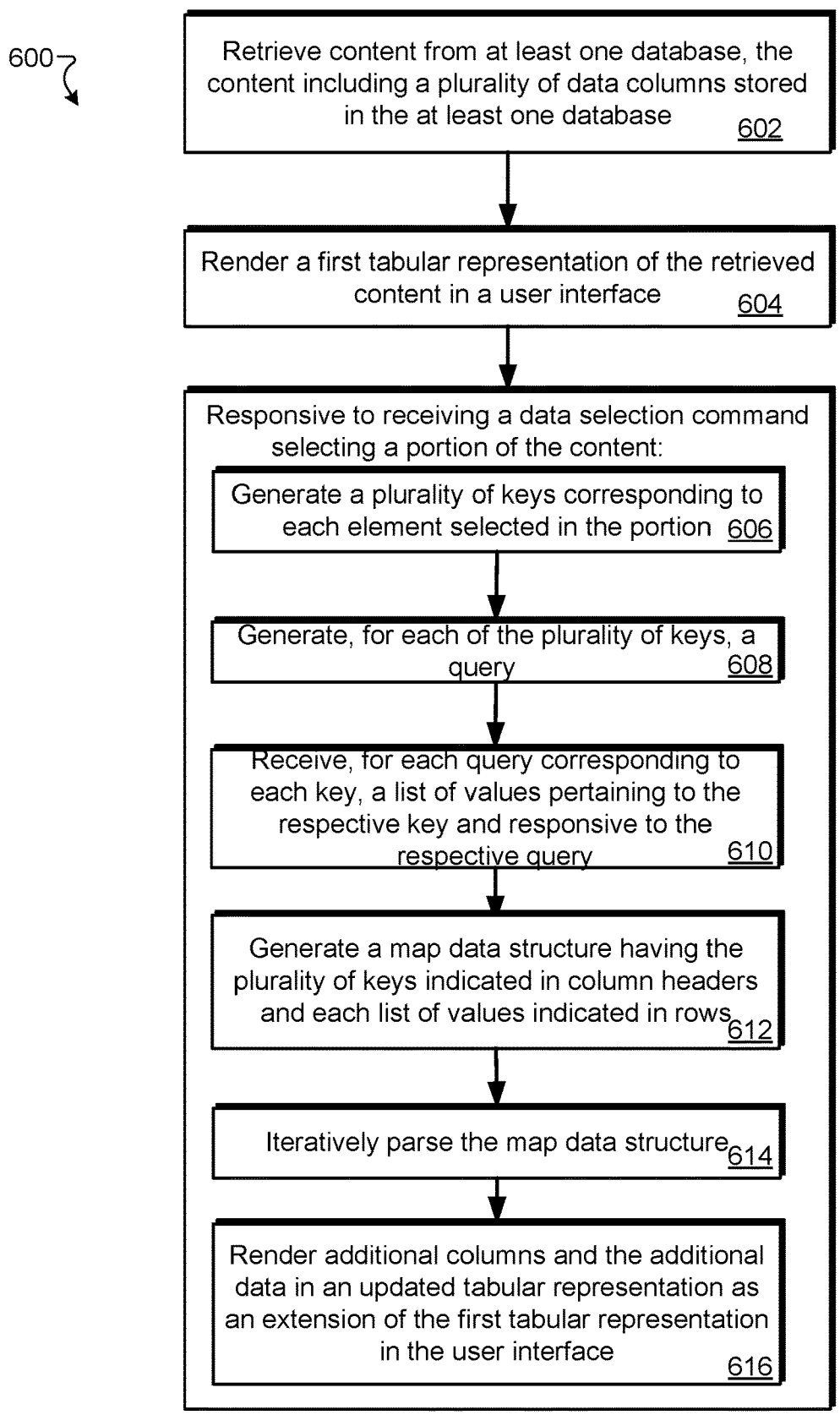
FIG. 6 is an illustration of an example process performed by the system of FIG. 1, in accordance with the principles of the present disclosure.

FIG. 6 is an illustration of an example process 600 performed by the system of FIG. 1, in accordance with the principles of the present disclosure. The process 600 may be computer implemented. In some implementations, the process 600 may be run online and/or by a service.

At block 602, the process 600 includes retrieving content from at least one database. For example, content may be retrieved from datasets in database 126, for example. The content may, for example, include a number of data columns stored in the at least one database. The content may include textual content, numerical content, symbolic content, graphical content, metadata content, formatting content, etc.

At block 604, the process 600 includes rendering a first tabular representation of the retrieved content in a user interface. For example, content may be retrieved from a database using a format associated with retrieving content from the database. The retrieved content may be displayed in a 2D or 3D table, a graphical format of the table, or other database or application-initiated format.

In response to receiving a data selection command in the user interface, the process 600 may include at block 606, generating a number of keys corresponding to each element selected in the portion. In an example, the data selection command may include selecting a portion of the content in the first tabular representation. For example, a user may select upon a portion of a UI table and may trigger automatic generation of keys for each selected element. The keys may be used to query a database to retrieve values that a user may wish to see and that correspond to the keys. At block 608, the process 600 includes generating, for each of the plurality of keys, a query to retrieve a plurality of values corresponding to each respective key. For example, the query generator 135 may generate the query using a map 138 generated by maps 138.

At block 610, the process 600 includes receiving, for each query corresponding to each key, a list of values pertaining to the respective key and responsive to the respective query. The values may be generated in the list and mapped to the respective keys used in the respective queries. The maps 138 may include the keys and values parried off into key-value pairs 140, for example.

At block 612, the process 600 includes generating a map data structure constructed in tabular form and having the keys indicated as column headers while each list of values is indicated in rows. Each list of values is mapped to a respective key in the plurality of keys using map generator 136.

At block 614, the process 600 includes iteratively parsing the map data structure for each key to generate a number of additional columns and additional data. The additional data and additional columns include the keys and their list of values being populated into a table (e.g., a UI table 101). In some implementations, the additional columns and the additional data are retrieved using the map data structure, but are not indicated as columnar data retrievable from the at least one database using a format defined in the at least one database. For example, the additional columns and the additional data are generated by system 100 from a number of data content items retrieved from the database. The additional columns and the additional data are not retrievable from the database in the form that the UI tables and the map data structure can provide for.

At block 616, the process 600 includes rendering the additional columns and the additional data in an updated tabular representation as an extension of the first tabular representation in the user interface. For example, additional columns 125 may be added to other columns in table 101 to form a cohesive table of data in which the user wishes to interact. In some implementation, the updated tabular representation includes a variable number of columns based on a number of elements selected in the portion. For example, if twenty elements are selected, twenty keys are generated and twenty columns are added to the initial table.

In some implementations, the initially retrieved database content may include formatting information associated with the at least one database while the first tabular representation is formatted according to a format defined in the at least one database, and the additional columns and the additional data are retrieved from the database and formatted according to the map data structure described herein. In some implementations, the selected portion of the content includes a number of elements representing two or more rows and two or more columns of the content.

In some implementations, the process 600 may retrieve content to populate any number of updated tabular UI tables. For example, responsive to receiving an additional data selection command in the user interface, the data access layer 132 may use query engine 120 to retrieve values (e.g., content) from databases 126. The additional data selection command may have been provided by a user to select a second portion in the updated tabular representation. In response, the system 100 (e.g., map generator 136 may generate a second set of keys corresponding to each element selected in the second portion. In addition, the query generator 135 may use the second set of keys to generate queries to retrieve values corresponding to each respective key in the second set of keys.

A response to the queries may be received for each query corresponding to each key in the second set of keys. In response, a number of lists of values may be generated in which each list pertains to the respective key in the second set of keys and responsive to the respective query corresponding to each of the second set of keys, the map generator 136 may generate a second map data structure constructed in tabular form and having the second set of keys indicated in column headers. Each list of values may pertain to the respective key in the second set of keys, indicated in rows, each list of values being mapped to a respective key in the second set of keys.

The logic layer 134 may iteratively parse the second map data structure for each key in the second set of keys to generate and render, in the user interface, a third tabular representation. The third tabular representation is rendered as an extension of the first tabular representation and the updated tabular representation. That is, the first tabular representation, the updated tabular representation, and the third tabular representation are rendered adjacent to one another in a combined table in the user interface.

The present disclosure describes a number of graphical user interfaces of software applications that display content together with functions and other information. Such applications may include, among other things, standalone software programs with a built-in display module that generates a graphical user interface. Alternatively, display functionality may be provided separately, e.g., as an add-on package, a plug-in or through a separate program that communicates with a content providing program via an Application Program Interface (API). The content providing program and/or the display program may be executed locally on a user device and/or remotely, as a Web application, for example.

The multiple applications described herein may be hosted on the same or different types of computer platforms or systems (possibly including some applications hosted on the client device itself). In example implementations, the different types of computer platforms or systems may include, for example, SAP S/4HANA®, SAP ABAP® development tools, or other enterprise-type computer platforms or systems.

In example implementations, the suite of the multiple applications which an enterprise may deploy for its operations (e.g., in the areas or domains of Finance, R&D, Engineering, Human Resources, Manufacturing, etc.) may be large. Different subsets of these applications may be used in the work of enterprise personnel who may have a variety of different roles. Each user may have a need to use a different respective subset of the multiple applications, based, for example, on the user's role in the enterprise.

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable non-transitory storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

In one general aspect, a system for generating a user interface is described. The system may include a shell container, executing in a web browser and providing a plurality of services for configuring a plurality of user interface content. The system may also include an application container, executing in the web browser. The application container using at least one processor may be programmed to retrieve content from at least one database. The content may include a plurality of data columns stored in the at least one database. The processor may be further programmed to render a first tabular representation of the retrieved content in a user interface and responsive to receiving a data selection command in the user interface that selects a portion of the content in the first tabular representation, the processor may be programmed to generate a plurality of keys corresponding to each element selected in the portion, generate for each of the plurality of keys, a query to retrieve a plurality of values corresponding to each respective key. The processor may be further programmed to receive, for each query corresponding to each key, a list of values pertaining to the respective key and responsive to the respective query. The processor may be further programmed to generate a map data structure constructed in tabular form and having the plurality of keys indicated in column headers and each list of values indicated in rows. Each list of values may be mapped to a respective key in the plurality of keys. The processor may be further programmed to iteratively parse the map data structure for each key to generate a plurality of additional columns and additional data and to render the additional columns and the additional data in an updated tabular representation as an extension of the first tabular representation in the user interface.

In some implementations, the content further includes formatting information associated with the at least one database. The first tabular representation is formatted according to a format defined in the at least one database and the additional columns and the additional data are retrieved from the database and formatted according to the map data structure. In some implementations, the selected portion of the content includes a plurality of elements representing two or more rows and two or more columns of the content. In some implementations, the updated tabular representation includes a variable number of columns based on a number of elements selected in the portion.

In some implementations, the updated tabular representation is rendered as an extension of the first tabular representation, and the first tabular representation and the updated tabular representation are rendered adjacent to one another in a combined table in the user interface. In some implementations, the additional columns and the additional data are retrieved using the map data structure, but are not indicated as columnar data retrievable from the at least one database using a format defined in the at least one database.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

What is claimed is:

1. A computer-implemented method comprising:
   retrieving at least a part of a multi-dimensional dataset from at least one database, the at least a part of a multi-dimensional dataset including a plurality of data columns stored in the at least one database;
   rendering, in a user interface, a first tabular representation of the retrieved at least a part of a multi-dimensional dataset; and
   responsive to receiving, in the user interface, a data selection command selecting a plurality of elements of the at least a part of a multi-dimensional dataset in the first tabular representation:
      generating a plurality of keys, each key corresponding to one of the plurality of selected elements and a list of entries corresponding to each respective key, wherein a length of each list of entries is determined based on each selected element, generating, for each of the plurality of keys, a query to retrieve a list of values corresponding to each list of entries, receiving, for each query corresponding to each key, the list of values pertaining to the respective key and responsive to the respective query, generating a map data structure constructed in a tabular form and having the plurality of keys indicated in column headers and each list of values indicated in rows, each list of values being mapped to a respective key in the plurality of keys, iteratively parsing the map data structure for each key to generate a plurality of additional columns, rows, or columns and rows, and rendering the additional columns, rows, or columns and rows in an updated tabular representation as an extension of the first tabular representation in the user interface.

2. The method of claim 1, wherein:

the at least a part of a multi-dimensional dataset further includes formatting information associated with the at least one database;

the first tabular representation is formatted according to a format defined in the at least one database; and the additional columns, rows, or columns and rows are retrieved from the database and formatted according to the map data structure.

3. The method of claim 1, wherein the selected plurality of elements of the at least a part of a multi-dimensional dataset includes a plurality of elements representing two or more rows and two or more columns of the at least a part of a multi-dimensional dataset.

4. The method of claim 1, wherein the updated tabular representation includes a variable number of columns based on a number of elements selected in the portion.

5. The method of claim 1, further comprising:

responsive to receiving an additional data selection command selecting a second plurality of elements of the at least a part of a multi-dimensional dataset in the updated tabular representation, generating a second set of keys corresponding to one of the plurality of selected in the second plurality of elements of the at least a part of a multi-dimensional dataset, wherein a length of each list of entries is determined based on each selected element, generating, for each of the second set of keys, a query to retrieve a list of values corresponding to each list of entries in the second set of keys, receiving, for each query corresponding to each key in the second set of keys, the list of values pertaining to the respective key in the second set of keys and responsive to the respective query corresponding to each of the second set of keys, generating a second map data structure constructed in tabular form and having the second set of keys indicated in column headers and each list of values, pertaining to the respective key in the second set of keys, indicated in rows, each list of values being mapped to a respective key in the second set of keys, and iteratively parsing the second map data structure for each key in the second set of keys to generate and render, in the user interface, a third tabular representation.

6. The method of claim 5, wherein the third tabular representation is rendered as an extension of the first tabular representation and the updated tabular representation, wherein the first tabular representation, the updated tabular representation, and the third tabular representation are rendered adjacent to one another in a combined table in the user interface.

7. The method of claim 1, wherein the additional columns, rows, or columns and rows are retrieved using the map data structure, but are not indicated as columnar data retrievable from the at least one database using a format defined in the at least one database.

8. A system for generating a user interface, the system comprising:

a shell container, executing in a web browser and providing a plurality of services for configuring a plurality of user interface content;

an application container, executing in the web browser, the application container using at least one processor programmed to, retrieve at least a part of a multi-dimensional dataset from at least one database, the at least a part of a multi-dimensional dataset including a plurality of data columns stored in the at least one database;

render, in a user interface, a first tabular representation of the retrieved at least a part of a multi-dimensional dataset; and responsive to receiving a data selection command in the user interface that selects a plurality of elements of the at least a part of a multi-dimensional dataset in the first tabular representation:

generating a plurality of keys, each key corresponding to one of the plurality of selected elements and a list of entries corresponding to each respective key, wherein a length of each list of entries is determined based on each selected element, generating, for each of the plurality of keys, a query to retrieve a list of values corresponding to each list of entries, receiving, for each query corresponding to each key, the list of values pertaining to the respective key and responsive to the respective query, generating a map data structure constructed in tabular form and having the plurality of keys indicated in column headers and each list of values indicated in rows, each list of values being mapped to a respective key in the plurality of keys, iteratively parsing the map data structure for each key to generate a plurality of additional columns, rows, or columns and rows, and rendering the additional columns, rows, or columns and rows in an updated tabular representation as an extension of the first tabular representation in the user interface.

9. The system of claim 8, wherein:

the at least a part of a multi-dimensional dataset further includes formatting information associated with the at least one database;

the first tabular representation is formatted according to a format defined in the at least one database; and the additional columns, rows, or columns and rows are retrieved from the database and formatted according to the map data structure.

10. The system of claim 8, wherein the selected plurality of elements of the at least a part of a multi-dimensional dataset includes a plurality of elements representing two or more rows and two or more columns of the at least a part of a multi-dimensional dataset.

11. The system of claim 8, wherein the updated tabular representation includes a variable number of columns based on a number of elements selected in the portion.

12. The system of claim 8, wherein the updated tabular representation is rendered as an extension of the first tabular representation, and
wherein the first tabular representation and the updated tabular representation are rendered adjacent to one another in a combined table in the user interface.

13. The system of claim 8, wherein the additional columns, rows, or columns and rows are retrieved using the map data structure, but are not indicated as columnar data retrievable from the at least one database using a format defined in the at least one database.

14. A computer program product, the computer program product being tangibly embodied on a non-transitory computer-readable storage medium and comprising instructions that, when executed, are configured to cause at least one computing device to:
retrieve at least a part of a multi-dimensional dataset from at least one database, the at least a part of a multi-dimensional dataset including a plurality of data columns stored in the at least one database;
render, in a user interface, a first tabular representation of the retrieved at least a part of a multi-dimensional dataset; and
responsive to receiving a data selection command in the user interface that selects a plurality of elements of the at least a part of a multi-dimensional dataset in the first tabular representation:
generating a plurality of keys, each key corresponding to one of the plurality of selected elements and a list of entries corresponding to each respective key, wherein a length of each list of entries is determined based on each selected element,
generating, for each of the plurality of keys, a query to retrieve a list of values corresponding to each list of entries,
receiving, for each query corresponding to each key, the list of values pertaining to the respective key and responsive to the respective query,
generating a map data structure constructed in tabular form and having the plurality of keys indicated in column headers and each list of values indicated in rows, each list of values being mapped to a respective key in the plurality of keys,
iteratively parsing the map data structure for each key to generate a plurality of additional columns, rows, or columns and rows, and
rendering the additional columns, rows, or columns and rows in an updated tabular representation as an extension of the first tabular representation in the user interface.

15. The computer program product of claim 14, wherein:
the at least a part of a multi-dimensional dataset further includes formatting information associated with the at least one database;
the first tabular representation is formatted according to a format defined in the at least one database; and
the additional columns, rows, or columns and rows are retrieved from the database and formatted according to the map data structure.

16. The computer program product of claim 14, wherein the selected plurality of elements of the at least a part of a multi-dimensional dataset includes a plurality of elements representing two or more rows and two or more columns of the at least a part of a multi-dimensional dataset.

17. The computer program product of claim 14, wherein the updated tabular representation includes a variable number of columns based on a number of elements selected in the portion.

18. The computer program product of claim 14, wherein the instructions, when executed, are further configured to:
receive an additional data selection command selecting a second plurality of elements of the at least a part of a multi-dimensional dataset in the updated tabular representation, and in response,
generate a second set of keys corresponding to one of the plurality of selected in the second plurality of elements of the at least a part of a multi-dimensional dataset, wherein a length of each list of entries is determined based on each selected element,
generate, for each of the second set of keys, a query to retrieve a list of values corresponding to each list of entries in the second set of keys,
receive, for each query corresponding to each key in the second set of keys, the list of values pertaining to the respective key in the second set of keys and responsive to the respective query corresponding to each of the second set of keys,
generate a second map data structure constructed in tabular form and having the second set of keys indicated in column headers and each list of values, pertaining to the respective key in the second set of keys, indicated in rows, each list of values being mapped to a respective key in the second set of keys, and
iteratively parse the second map data structure for each key in the second set of keys to generate and render, in the user interface, a third tabular representation.

19. The computer program product of claim 18, wherein the third tabular representation is rendered as an extension of the first tabular representation and the updated tabular representation,
wherein the first tabular representation, the updated tabular representation, and the third tabular representation are rendered adjacent to one another in a combined table in the user interface.

20. The computer program product of claim 14, wherein the additional columns, rows, or columns and rows are retrieved using the map data structure, but are not indicated as columnar data retrievable from the at least one database using a format defined in the at least one database.

* * * * *